United States Patent Office 3,337,522
Patented Aug. 22, 1967

3,337,522
DISPERSIBLE MONOAZO DYES
Hans E. Wegmüller, Riehen, Switzerland, assignor to
J. R. Geigy A.G., Basel, Switzerland
No Drawing. Filed Aug. 17, 1964, Ser. No. 390,231
Claims priority, application Switzerland, Sept. 6, 1963,
11,027/63
5 Claims. (Cl. 260—158)

This invention relates to new dispersible monoazo dyes which are difficultly soluble in water, processes for the production thereof, processes for the dyeing of hydrophobic organic fibers using the new dyestuffs and, as industrial products, the textile fibers and fiber materials dyed with the aid of these dyes.

It has been found that non-sulfonated, non-metallizable, dispersible azo dyestuffs of the formula

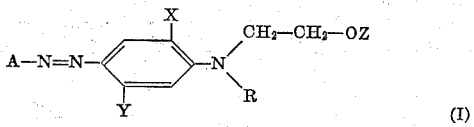

when used in the dyeing of polyester textile fibers from aqueous dyestuff dispersions, especially of polyethylene glycol terephthalate under the conditions of high-temperature dyeing, i.e. at temperatures above 100° C. under excess pressure, tend to saponify, and this the more the higher the pH of the dyebath and/or that of an alkaline after-treatment bath. This lack of stability of the aforesaid dyestuffs is responsible for a number of drawbacks. Thus, the hydrolytic degradation during the dyeing process leads to dyestuffs which are substantially more bathochrome than the intact dyes of Formula I, whereby it becomes difficult to obtain dyed goods of equal shade from different batches.

Moreover, the dyeings with the hydrolyzed dyestuffs are much less fast to light than the dyeings obtained with the unhydrolyzed dyes of Formula I.

We have found that surprisingly stable azo dyestuffs which are difficultly soluble in water and which can be used as dispersible dyestuffs, are those of the formula

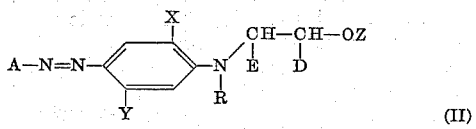

which dyestuffs are obtained by coupling the diazonium compound of an amine of the formula $$A-NH_2 \quad \text{(III)}$$

with a coupling component of the formula

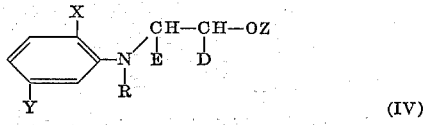

In the preceding formulas:
A represents a nitro-substituted phenyl radical or a mono- or di-nuclear heterocyclic-aromatic radical, which radicals are unsubstituted or substituted non-ionogenically, as defined below,
X represents hydrogen, a lower alkyl group, a lower alkoxy group or, as halogen, bromine or, preferably, chlorine;
Y represents hydrogen, a lower alkyl, lower alkoxy, lower alkanoylamino, chloro- and bromo-alkanoylamino, the trifluoromethyl group, or, as halogen, bromine, or, preferably, chlorine;
R represents lower alkyl, but, preferably, lower alkanoyloxy-alkyl, lower alkoxy-carbonyl-alkyl, cyano-alkyl, chloro-alkyl or bromo-alkyl in which substituted alkyl radicals the alkyl moiety has from 2 to 4, and preferably 2, carbon atoms, and the substituent is in β, γ or δ position, respectively;
One of D and E represents hydrogen and the other phenyl and
Z represents an acyl group as defined below.
The components are to be so chosen that the dyestuff does not contain any salt-forming, water-solubilizing groups which dissociate acid in water.

In the compounds according to the invention, the phenyl radical A is unsubstituted, apart from the nitro group which is preferably in o- or p-position to the azo bridge, or the phenyl radical A is further substituted, apart from the aforesaid nitro group, by from one to two shade-influencing substituents defined below, one of which is, preferably, in the o-position or p-position which is not occupied by the aforesaid nitro group; these substituents, which are referred to for the sake of brevity as "shade-influencing" substituents, are members selected from the following class:

Electron-attracting substituents, namely, a fluorine atom, a nitro, a cyano, or trifluoromethyl group, an acyl group as defined further below, lower alkyl sulfonyl or arylsulfonyl, especially phenylsulfonyl, also lower alkoxy-carbonyl, aryloxy sulfonyl, especially phenoxy sulfonyl, carbamyl or sulfamyl or from one to two chlorine or bromine atoms.

In addition to the nitro group, or to the nitro group and the aforesaid electron-attracting substituent, the phenyl radical can also contain an electron-releasing group, for example, an aliphatic group such as lower alkyl or lower alkyl substituted by hydroxyl, lower alkoxy or by halogen such as fluorine, chlorine or bromine, an aromatic group, especially phenyl, a lower alkoxy group, an aryloxy, especially a phenoxy group, or an arylamino group, the latter being defined below.

Acyl groups as electron-attracting substituents in A are preferably carbacyl radicals, particularly lower alkanoyl radicals such as the acetyl or propionyl radical, or aroyl radicals such as the benzoyl radical.

Examples of acylamino radicals as electron-releasing substituents in A are lower alkanoylamino radicals such as the acetylamino radical, aroylamino radicals, e.g. the benzoylamino radical, or lower alkylsulfonylamino radicals such as the methylsulfonylamino radical or arylsulfonylamino radicals such as the phenylsulfonaylamino radical.

Preferred substituents, in A being phenyl, are nitro and cyano as well as halogen, in particular chlorine and bromine. These substituents are advantageously in the o- and or p-position to the azo bond.

In those dyestuffs falling under Formula II in which A is a heterocyclic-aromatic radical, it is the radical of a 5- or 6-membered heterocycle, in particular 5-nitro-thiazolyl-(2) or benzothiazolyl-(2).

The benzothiazolyl-(2) radical preferably contains, advantageously in 6-position, electron-attracting substituents such as lower alkylsulfonyl or nitro, cyano, thiocyano, chlorine or bromine.

Z represents above all a carbacyl radical, in particular a carbacyl radical of the aliphatic series, e.g. lower alkanoyl radical having preferably 2 to 4 carbon atoms such as the acetyl, propionyl or butyryl radical, chloro- or bromo-lower alkanoyl, preferably of from 2 to 4 carbon atoms, or an aroyl radical, especially a mononuclear aroyl radical, e.g. the benzoyl radical, a lower alkoxy carbonyl radical or an arylsulfonyl radical preferably having a mononuclear aryl group such as the phenylsulfonyl or p-toluylsulfonyl radical.

In preferred dyestuffs of Formula II, A is an electrophilically substituted phenyl radical or a mono- or dinuclear heterocyclic-aromatic radical as defined above, and R is one of the above-listed substituents other than alkyl, the dyeings with dyestuff in which R is alkyl being of less satisfactory light fastness.

The term "lower" as used in this specification and in the appended claims in connection with "alkyl" and "alkoxy" means that these radicals have from 1 to 4 carbon atoms, in connection with "alkanoyl" it means radicals of from 2 to 5 carbon atoms.

The dyestuffs according to the invention are brought into finely dispersed form by milling with dispersing agents. Suitable dispersing agents are, e.g. anionic ones such as alkylaryl sulfonates, condensation products of formaldehyde and naphthalene sulfonic acids, lignin sulfonates, or non-ionogenic ones such as fatty alcohol polyglycol ethers. Advantageously mixtures of the anionic and non-ionogenic dispersing agents mentioned are used.

In this form, the dyestuffs according to the invention are suitable for the dyeing of hydrophobic organic synthetic textile fibers from an aqueous dispersion, namely for the dyeing of cellulose di- and tri-acetate, and particularly for the dyeing of high molecular esters of aromatic polycarboxylic acids with polyfunctional alcohols, e.g. polyethylene glycol terephthalate fibers.

The dyestuffs according to the invention can also be used for the dyeing of synthetic polyamide fibers.

Valuable dyeings can also be attained with dyestuffs according to the invention on polyacrylonitrile fibers.

Polyglycol terephthalate fibers are dyed with aqueous dispersions of the dyestuffs according to the invention preferably by the high temperature process, at temperatures of over 100° C. under pressures above atmospheric. The dyeing can also be performed, however, at the boiling point of the dyebath under ambient pressure in the presence of carriers such as, e.g. phenylphenol, polychlorobenzene compounds or similar auxiliaries, or they can be pad-dyed followed by thermofixation at 180–210° C.

Dyestuffs according to the invention have good affinity for hydrophobic organic fibers, particularly polyglycol terephthalate type fibers and, depending on their composition, produce on these fibers strongly colored orange, scarlet, red, brown, violet or blue dyeings which have very good fastness to washing, milling, sublimation, light, rubbing, perspiration, organic solvents, cross-dyeing, decatizing and gas-fading. Moreover, the dyestuffs according to the invention reserve vegetable and animal fibers, particularly cotton, well. In addition, they can be evenly dyed using the above-mentioned commercially available carriers.

Compared with previously known dyestuffs of similar constitution, the new dyestuffs are distinguished by affording dyeings on the above-mentioned textile fibers which are fast to light and/or to sublimation. While, generally, an improvement of the fastness to sublimation is accompanied by a decrease of the drawing power of the dyestuffs, unexpectedly the drawing power of the dyestuffs according to the invention, especially on polyethylene glycol terephthalate type fibers remains either the same, or is even increased in spite of the increased fastness to sublimation.

As a special advantageous feature, the dyestuffs according to the invention are stable under the severe conditions of the dyeing of polyester textile fibers, especially also in an alkaline after-treatment, as mentioned hereinbefore.

The dyestuffs falling under Formula II in which A represents a radical of the formula

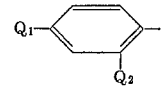

wherein one of $Q_1$ and $Q_2$ represents nitro and the other hydrogen, chlorine, bromine, cyano, nitro, lower alkoxy-carbonyl, phenyloxy-sulfonyl, sulfamyl, lower alkyl-sulfonyl, lower alkyl and trifluoromethyl, and those in which A represents a radical of the formula

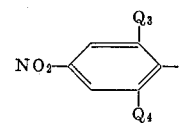

wherein $Q_3$ represents chlorine or bromine and $Q_4$ represents chlorine, bromine or nitro, and R represents one of the listed substituents other than lower alkyl, are distinguished by particularly high color strength in dyeings on polyethylene glycol terephthalate fibers.

Among this preferred subclass of dyestuffs according to the invention, those in which A represents the radicals

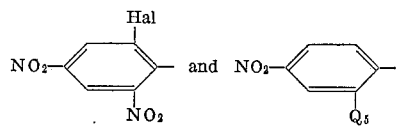

wherein Hal represents chlorine or bromine, and $Q_5$ represents hydrogen, chlorine, bromine, cyano or nitro, excel in view of the outstanding light fastness of their dyeings on polyethylene glycol terephthalate fibers.

The coupling component of Formula IV is obtained by reacting styrene oxide with an amine of the formula

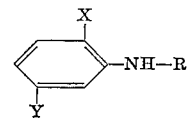

wherein X, Y and R have the same meanings as given above, advantageously in an organic solvent, e.g. in an unsubstituted or halogenated aromatic hydrocarbon such as chlorobenzene, in the presence of glacial acetic acid as catalyst. In this reaction, two isomeric compounds are formed which are of the formulas

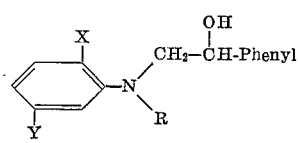

and

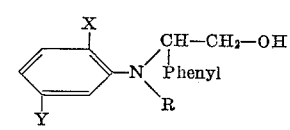

the mixture of which being the product of the above reaction is represented in this specification and in the appended claims by the formula

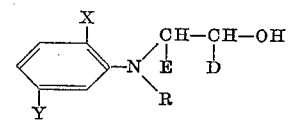

(V)

wherein X, Y, R, E and D have the meanings given above. These styrene oxide-amine-condensation products are acylated with an agent introducing the acyl radical Z to form the coupling component of Formula IV. The anhydrides of lower fatty acids such as acetanhydride or propionic acid anhydrides and also acyl chlorides and bromides, mainly carboxylic acid chlorides and bromides of the aliphatic or aromatic series, e.g. acetyl, propionyl or benzoyl chloride or bromide, and also lower alkyl chloroformates or bromoformates, are used as acylating agents.

The diazonium compound obtained by diazotizing the amine of Formula III is coupled with the coupling component of Formula IV by known methods, preferably in an acid aqueous medium, in particular at a pH of 4 to 4.5. When the coupling is performed in a mineral acid medium, the acid is advantageously gradually buffered, e.g. with alkali metal salts of lower fatty acids.

A modification of the process according to the invention, consists in reacting an azo dyestuff of the formula

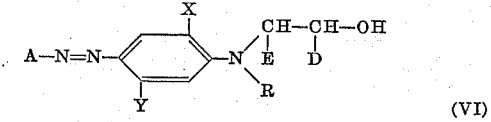

(VI)

with an acylating agent introducing the acyl radical Z to form a compound of Formula II. In this formula, the symbols A, X, Y, R, E, D and Z have the same meanings as given hereinbefore.

The azo dyestuffs of Formula VI are obtained by coupling the diazonium compound of an amine of Formula III with a coupling component of Formula V, the coupling being performed as described above. The acylating agents given above, for example, are suitable for the introduction of the acyl radical.

The dyestuffs of Formula VI are acylated to obtain the dyestuffs according to the invention with the aid of an acylating agent introducing the radical Z, advantageously at a raised temperature in a suitable organic solvent such as glacial acetic acid, chlorobenzene or dioxan and, if necessary, in the presence of an acid binding agent such as sodium acetate or pyridine.

The following non-limitative examples illustrate the invention further. Where not otherwise expressly stated, parts and percentages are given by weight. The temperatures are in degrees centigrade. The relationship of parts by weight to parts by volume is as that of grams (g.) to milliliters (ml.).

*Example 1*

A fine suspension of 17.3 parts of 1-amino-2-chloro-4-nitrobenzene in 300 parts of water and 30 parts of 36% hydrochloric acid is diazotized at 0–5° by the dropwise addition of a solution of 6.9 parts of sodium nitrite in 50 parts of water. The clear diazonium salt solution is added dropwise at 0–5° to a solution of 30.8 parts of a mixture of N-($\alpha$-phenyl-$\beta$-acetoxyethyl)-N-($\beta'$-cyanoethyl)-aniline and N-($\beta$-phenyl-$\beta$-acetoxyethyl)-N-($\beta'$-cyanoethyl)-aniline in 700 parts of water, 300 parts of 80% acetic acid and 30 parts of 36% hydrochloric acid. The pH of the reaction mixture is then buffered by the addition of sodium acetate to 4 to 4.5. The orange colored precipitate formed is filtered off, washed with water and dried in vacuo at 60–70°.

A dyestuff consisting of a mixture of the compounds of the formulas

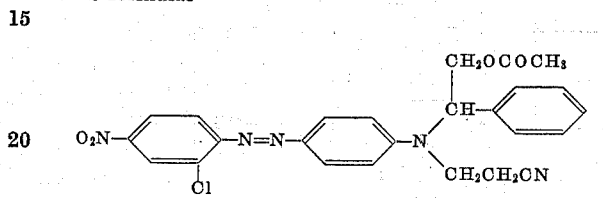

and

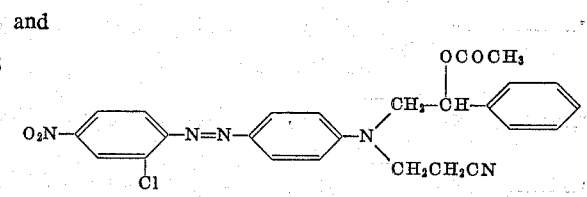

is obtained.

After milling this dyestuff mixture with the sodium salt of a condensation product of naphthalene-2-sulfonic acid and formaldehyde, it dyes polyglycol terephthalate fibers in the presence of sodium-o-phenylphenolate as carrier, in orange shades. The dyeings have very good fastness to washing, rubbing, light and sublimation. The mixture of N-($\alpha$-phenyl-$\beta$-acetoxyethyl)-N-($\beta'$-cyanoethyl)-aniline and N-($\beta$-phenyl-$\beta$-acetoxyethyl)-N-($\beta'$-cyanoethyl)-aniline used in this example is obtained by reacting N-$\beta$-cyanoethyl aniline with styrene oxide in the presence of 2 to 5% glacial acetic acid and then acetylating the reaction products with acetanhydride.

Other dyestuffs embraced by the general Formula II given above which yield dyeings on polyglycol terephthalate fibers with similarly good properties are obtained if the diazo and coupling component given in the above Example 1 are replaced by equimolar amounts of the diazotizable amines and coupling components given in columns II and III respectively of the following Table 1.

TABLE 1

| I | II | III | | | | IV |
|---|---|---|---|---|---|---|
| | | Coupled component being mixture of: | | | | |
| Example No. | Diazotizable amine | | | | | Shade on polyglycol terephthalate fibres |
| | | X | Y | Z | R | |
| 2 | ⟨⟩-NH₂ with NO₂ | —H | —H | —COCH₃ | —CH₂CH₂OCOCH₃ | Reddish-orange. |
| 3 | ⟨⟩-NH₂ with NO₂ | —H | —H | —COOC₂H₅ | —CH₂CH₂CN | Orange. |

TABLE 1—Continued

| Example No. | Diazotizable amine | Coupled component being mixture of: (X, Y, Z, R) | | | | Shade on polyglycol terephthalate fibres |
|---|---|---|---|---|---|---|
| | | X | Y | Z | R | |
| 4 | CH₃O—⟨benzene⟩—NH₂, NO₂ | —H | —H | COC₂H₅ | —CH₂CH₃ | Red. |
| 5 | Cl—⟨benzene⟩—NH₂, NO₂ | —CH₃ | —H | —COCH₃ | —CH₂CH₂OCOCH₃ | Red. |
| 6 | Cl—⟨benzene⟩—NH₂, NO₂ | —H | —NH—COCH₃ | —CO—⟨phenyl⟩ | —CH₂CH₂CN | Scarlet. |
| 7 | O₂N—⟨benzene⟩—NH₂ | —H | —NH—COCH₃ | —COC₂H₅ | —CH₂CH₂OCOC₂H₅ | Red. |
| 8 | O₂N—⟨benzene⟩—NH₂ | —Cl | —H | —COOCH₃ | —CH₂CH₂CN | Orange. |
| 9 | O₂N—⟨benzene⟩—NH₂, Cl | —H | —NH—COC₂H₅ | —COCH₃ | —CH₂CH₂CN | Scarlet. |
| 10 | O₂N—⟨benzene⟩—NH₂, Cl | —H | —CH₃ | —COCH₃ | —CH₂CH₂COOCH₃ | Red. |
| 11 | O₂N—⟨benzene⟩—NH₂, Cl, Cl | —H | —CH₃ | —COCH₂CH₂Br | —CH₂CH₂CN | Brown. |
| 12 | O₂N—⟨benzene⟩—NH₂, CN | —H | —H | —COCH₃ | —CH₂CH₂CN | Red. |
| 13 | O₂N—⟨benzene⟩—NH₂, CN | —H | —CH₃ | —COCH₃ | —CH₂CH₂Cl | Ruby. |
| 14 | O₂N—⟨benzene⟩—NH₂, CN | —OC₂H₅ | —NH—COCH₃ | —COCH₃ | —CH₂CH₂OCOCH₃ | Violet. |
| 15 | O₂N—⟨benzene⟩—NH₂, NO₂ | —CH₃ | —H | —SO₂—⟨phenyl⟩—CH₃ | —CH₃ | Violet. |
| 16 | O₂N—⟨benzene⟩—NH₂, NO₂ | —H | —H | —COOC₂H₅ | —CH₂CH₂CN | Bordeaux. |
| 17 | O₂N—⟨benzene⟩—NH₂, NO₂ | —OCH₃ | —H | —COCH₃ | —CH₂CH₂COOCH₃ | Violet. |
| 18 | O₂N—⟨benzene⟩—NH₂, NO₂ | —OC₂H₅ | —NH—COCH₃ | —COCH₃ | —CH₂CH₂CN | Do. |
| 19 | CH₃SO₂—⟨benzene⟩—NH₂, NO₂ | —H | —H | —COCH₂Cl | —CH₂CH₂CN | Red. |

TABLE 1—Continued

| Example No. | Diazotizable amine | X | Y | Z | R | Shade on polyglycol terephthalate fibres |
|---|---|---|---|---|---|---|
| 20 | CF$_3$-C$_6$H$_3$(NO$_2$)-NH$_2$ | —H | —H | —COCH$_3$ | —CH$_2$CH$_2$CN | Red-orange. |
| 21 | F-C$_6$H$_3$(NO$_2$)-NH$_2$ | —H | CH$_3$ | —COC$_3$H$_7$ | —CH$_2$CH$_2$CN | Scarlet. |
| 22 | O$_2$N-thiazolyl-NH$_2$ | —OCH$_3$ | —H | —COCH$_3$ | —CH$_2$CH$_2$COOCH$_3$ | Violet. |
| 23 | O$_2$N-thiazolyl-NH$_2$ | —H | —CH$_3$ | —SO$_2$-C$_6$H$_5$ | —CH$_2$CH$_2$CN | Do. |
| 24 | CH$_3$SO$_2$-benzothiazolyl-NH$_2$ | —H | —H | —COCH$_3$ | —CH$_2$CH$_2$CN | Red. |
| 25 | CH$_3$SO$_2$-benzothiazolyl-NH$_2$ | —H | —CF$_3$ | —COCH$_3$ | —CH$_2$CH$_2$CN | Bluish-red. |

Example 26

21.7 parts of 1-amino-2,4-dinitro-6-chlorobenzene are dissolved in 150 parts of concentrated sulphuric acid and the solution is diazotised at 20–25° for 3 hours with nitrosyl sulphuric acid, corresponding to 6.9 parts of sodium nitrite.

Also, 44.2 parts of a mixture of N-(α-phenyl-β-acetoxyethyl) - N - (β' - acetoxyethyl) - 2 - ethoxy - 5- acetylamino aniline and N-(β-phenyl-β-acetoxyethyl)-N-(β'-acetoxyethyl)-2-ethoxy-5-acetylamino aniline are dissolved in 600 parts of water, 300 parts of 80% acetic acid and 100 parts of 36% hydrochloric acid. The previously prepared diazonium salt solution is added dropwise to this solution at 0–5°. On completion of the coupling, the black precipitate formed is filtered off, washed neutral with dilute sodium carbonate solution and finally washed free of salt with water.

A mixture of dyestuffs of the formulae

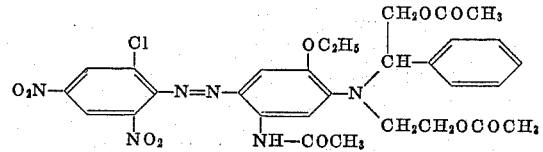

and

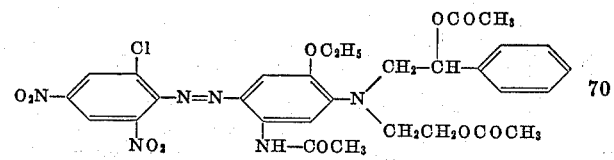

is obtained in this way. This dyestuff mixture is dried in vacuo at 60–90° and then finely milled with a lignin sulphonate. Polyglycol terephthalate fibres or cellulose triacetate fibres can be dyed with this preparation in an aqueous dispersion, optionally in the presence of sodium-o-phenylphenolate, in blue-violet shades. The dyeings have very good fastness to light and sublimation.

The mixture of N-(α-phenyl-β-acetoxyethyl)-N-(β'-acetoxyethyl) - 2 - ethoxy - 5 - acetylamino aniline and n-(β - phenyl - β - acetoxyethyl) - N - (β' - acetoxyethyl)-2-ethoxy-5-acetylamino aniline used in this example as coupling component is obtained by adding styrene oxide to N-(β-hydroxyethyl)-2-ethoxy-5-acetylamino aniline in the presence of 2 to 5% glacial acetic acid and then acetylating the reaction products with acetanhydride.

Example 27

16.3 parts of 1-amino-2-cyano-4-nitrobenzene in 100 parts of concentrated sulphuric acid are diazotised at 0–5° with nitrosyl sulphuric acid, corresponding to 6.9 parts of sodium nitrite. The diazonium salt solution is added dropwise at 0–5° to a solution of 35.5 parts of a mixture of N-(α-phenyl-β-acetoxyethyl)-N-(β'-acetoxyethyl)-3-methyl-aniline and N-(β-phenyl-β-acetoxyethyl)-N-(β'-acetoxyethyl)-3-methyl-aniline in 600 parts of water, 250 parts of 80% acetic acid and 50 parts of 36% hydrochloric acid. On completion of the coupling, the violet precipitate is filtered off and washed and dried in the usual way.

A mixture of dyestuffs of the formulae

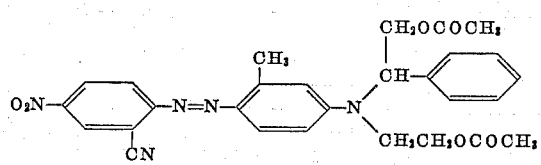

and

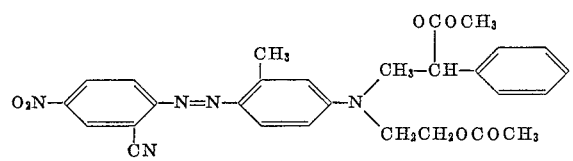

is obtained.

2 parts of this dyestuff mixture are brought into a finely dispersed form by milling with 5 parts of a lignin sulphonate.

The mixture used as coupling component in this example is obtained by reacting styrene oxide with N-(β-hydroxyethyl)-3-methyl aniline and then acetylating the products of addition obtained with acetanhydride.

*Example 28*

The diazonium salt solution of 16.3 parts of 1-amino-2-cyano-4-nitrobenzene produced according to Example 27 is added dropwise at 0–5° to a solution of 34.1 parts of a mixture consisting of N-(α-phenyl-β-hydroxyethyl)-N-(β'-carbomethoxyethyl)-aniline and N-(β-phenyl-β-hydroxyethyl)-β'-carbomethoxyethyl)-aniline. On completion of the coupling, the black-brown precipitate is filtered off, washed with water and dried in vacuo at 80–90°.

100 parts of glacial acetic acid and 20 parts of acetanhydride are then added to 20 parts of the coupling product so obtained and the whole is heated for 4 hours at 100–110°. The acetylating mixture is cooled and then 200 parts of ethyl alcohol and 400 parts of water are added. The precipitate formed is filtered off, washed with water and dried in the usual way.

A mixture of dyestuffs of the formulae

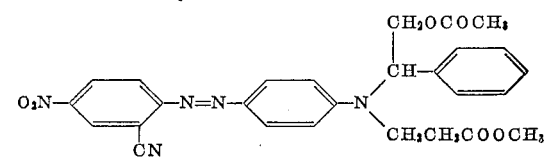

and

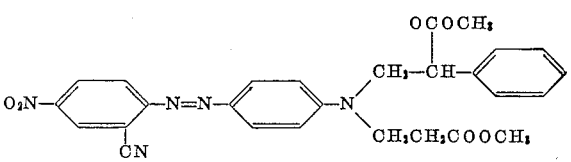

is obtained.

5 parts of this dyestuff mixture are milled with 15 parts of the sodium salt of a condensation product of naphthalene-2-sulphonic acid and formaldehyde. Polyglycol terephthalate fibres can be dyed with this dye preparation from an aqueous dispersion in the presence of sodium-o-phenylphenolate as carrier in bluish-red shades. The dyeings have very good fastness to washing, rubbing, light and sublimation.

The coupling component used in this example is obtained by reacting styrene oxide with N-(β-carbomethoxyethyl)-aniline in the presence of 2 to 5% glacial acetic acid.

Dyestuffs having similarly good properties are obtained by reacting the coupling products given in column 2 of the following Table II under the conditions described in the above example with acetanhydride.

TABLE II

| Example No. | Coupled product being a mixture of: A—N=N—(X,Y,R aryl)—N—CH(CH₂OH)—phenyl and A—N=N—(X,Y,R aryl)—N—CH₂—CH(OH)—phenyl | | | | Shade on polyglycol terephthalate fibres |
|---|---|---|---|---|---|
| | A | X | Y | R | |
| 29 | CH₃—C₆H₄—(NO₂) | —H | —H | —CH₂CH₂CN | Orange. |
| 30 | CH₃—C₆H₄—(NO₂) | —H | —H | —CH₂CH₂OH | Scarlet. |
| 31 | O₂N—C₆H₄— | —H | —H | —CH₂CH₂CN | Orange. |
| 32 | O₂N—C₆H₄— | —H | —CH₃ | —CH₂CH₂OH | Red. |
| 33 | O₂N—C₆H₃—(CN) | —H | —CH₃ | —CH₂CH(OH)CH₂OH | Ruby. |
| 34 | O₂N—C₆H₃—(CN) | —H | —NH—COCH₃ | —CH₂CH₂CN | Red. |
| 35 | O₂N—C₆H₄—(NO₂) | —H | —Cl | —CH₂CH₂COOCH₃ | Bluish-red. |

TABLE II—Continued

Coupled product being a mixture of:

$$A-N=N-\underset{Y}{\underset{|}{\bigcirc}}-\underset{R}{\overset{X}{\underset{|}{N}}}-CH(CH_2OH)-C_6H_5 \quad \text{and} \quad A-N=N-\underset{Y}{\underset{|}{\bigcirc}}-\underset{R}{\overset{X}{\underset{|}{N}}}-CH_2-CH(OH)-C_6H_5$$

| Example No. | A | X | Y | R | Shade on polyglycol terephthalate fibres |
|---|---|---|---|---|---|
| 36 | $O_2N-C_6H_3(Br)(NO_2)-$ | $-OCH_3$ | $-NH-COC_2H_5$ | $-CH_2CH_2OH$ | Reddish-blue. |
| 37 | $O_2N-C_6H_3(Br)(NO_2)-$ | $-OC_2H_5$ | $-NH-COCH_3$ | $-CH_2CH_2CN$ | Violet. |
| 38 | $O_2N-C_6H_3(Cl)-$ | $-H$ | $-H$ | $-CH_2CH_2OH$ | Scarlet. |
| 39 | $O_2N-C_6H_3(Br)-$ | $-H$ | $-H$ | $-CH_2CH_2COOCH_3$ | Do. |
| 40 | $O_2N-C_6H_3(Br)(Br)-$ | $-H$ | $-H$ | $-CH_2CH_2OH$ | Violet. |
| 41 | $O_2N-C_6H_3(CF_3)-$ | $-H$ | $-H$ | $-CH_2CH_2CN$ | Scarlet. |
| 42 | $O_2N-C_6H_3(O-C_6H_5)-$ | $-OCH_3$ | $-H$ | $-CH_2CH_2OH$ | Bluish-red. |
| 43 | $O_2N-C_6H_3(OC_2H_5)-$ | $-H$ | $-NH-COCH_3$ | $-CH_2CH_2Cl$ | Do. |
| 44 | $O_2N-C_6H_3(SO_2C_2H_5)-$ | $-H$ | $-NH-CO-CH_2Cl$ | $-CH_2CH_2OH$ | Red. |
| 45 | $O_2N-C_6H_3(SO_2O-C_6H_5)-$ | $-H$ | $-NH-COCH_2CH_2Br$ | $-CH_2CH_2Br$ | Red. |
| 46 | $O_2N-C_6H_3(SO_2NH_2)-$ | $-Cl$ | $-H$ | $-CH_2CH_2CH_2CH_2Cl$ | Red. |
| 47 | $O_2N-C_6H_3(SO_2N(CH_3)_2)-$ | $-H$ | $-H$ | $-CH_2CH_2CN$ | Red. |
| 48 | $O_2N-C_6H_3(CH_3)(SO_2N(CH_3)(C_6H_5))-$ | $-H$ | $-NH-COC_3H_7$ | $-CH_3$ | Red. |

TABLE II—Continued

| Example No. | A | X | Y | R | Shade on polyglycol terephthalate fibres |
|---|---|---|---|---|---|
| 49 | H₂N—SO₂—⟨phenyl-NO₂⟩— | —OC₂H₅ | —H | —CH₂CH₂CN | Scarlet. |
| 50 | CH₃NH—SO₂—⟨phenyl-NO₂⟩— | —H | —NH—COC₃H₇ | —CH₂CH₂CN | Do. |
| 51 | Br—⟨phenyl-NO₂⟩— | —H | —Br | —CH₂CH₂CN | Red-brown. |
| 52 | CN—⟨phenyl-NO₂⟩— | —Br | —H | —CH₂CH₂OH | Bordeaux. |
| 53 | CH₃OOC—⟨phenyl-NO₂⟩— | —H | —H | —CH₂CH₂CN | Orange. |
| 54 | ⟨phenyl⟩—O—⟨phenyl-NO₂⟩— | —H | —OCH₃ | —CH₂CH₂CN | Red. |
| 55 | Cl—⟨benzothiazole⟩—C— | —H | —H | —CH₂CH₂CN | Red. |
| 56 | Br—⟨benzothiazole⟩—C— | —H | —H | —CH₂CH₂OH | Red. |

Coupled product being a mixture of:

$A-N=N-\underset{Y}{\overset{X}{\bigcirc}}-\underset{R}{N}-CH_2-\overset{CH_2OH}{\underset{}{CH}}-\bigcirc$  and  $A-N=N-\underset{Y}{\overset{X}{\bigcirc}}-\underset{R}{N}-CH_2-\overset{OH}{\underset{}{CH}}-\bigcirc$

Example 57

17.5 parts of 6-cyano-2-amino-benzothiazole are dissolved in 100 parts of concentrated sulphuric acid and the solution is diazotised at 0–5° with nitrosyl sulphuric acid, corresponding to 6.9 parts of sodium nitrite.

Also, 26.6 parts of a mixture of N-(α-phenyl-β-hydroxyethyl)-N-(β′-cyanoethyl)-aniline and N-(β-phenyl-β-hydroxyethyl)-N-(β′-cyanoethyl)-aniline are dissolved in 700 parts of water, 250 parts of 80% acetic acid and 50 parts of 36% hydrochloric acid. The previously prepared diazonium salt solution is added dropwise to this solution at 0–5°. On completion of the coupling, the dark precipitate is filtered off and washed with water in the usual way and dried.

10 parts of the coupling products so obtained are heated for 3 hours at 75–80° with 60 parts of glacial acetic acid, 20 parts of sodium acetate and 20 parts of propionic acid chloride. After cooling, 250 parts of ethyl alcohol and 400 parts of water are added to the reaction mixture. The precipitate formed is filtered off, washed with a lot of water and dried. In this way a mixture of dyestuffs of the composition

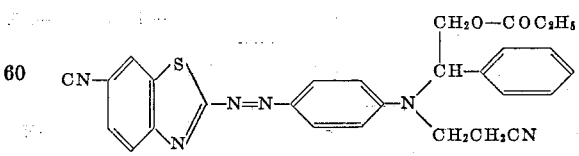

and

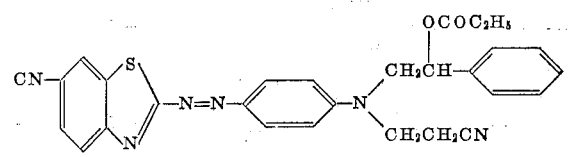

is obtained.

The dyestuff mixture obtained is brought into a finely dispersed form by milling 2 parts thereof with 6 parts of a lignin sulfonate. Polyglycol terephthalate fibers can be dyed with this dye preparation from an aqueous dispersion, in the presence of sodium-o-phenylphenolate, in red shades. The dyeings have good fastness to washing, rubbing and sublimation.

The mixture used in this example as coupling component is obtained by reacting styrene oxide with N-(β-cyanoethyl)-aniline in the presence of 2 to 5% glacial acetic acid.

Dyestuffs having similar properties are obtained by reacting the coupled products given in column 2 of the following Table III, which have been obtained by the procedure described in the above example, under the acylating conditions described in the above example with one of the acylating agents given in column 3.

Example 69

2 parts of the dyestuff obtained according to Example 1 are dispersed in 4000 parts of water. 12 parts of the sodium salt of o-phenylphenol as carrier and also 12 parts of diammonium phosphate are added to this dispersion and 100 parts of polyglycol terephthalate yarn are dyed for 1½ hours at 95–98°. The dyeing is rinsed and aftertreated with aqueous sodium hydroxide solution and a dispersing agent.

In this way a reddish orange dyeing is obtained which is fast to washing, light and sublimation.

If in the above example, the 100 parts of polyglycol terephthalate yarn are replaced by 100 parts of cellulose triacetate fabric, dyeing is performed under the conditions

TABLE III

Coupled product being a mixture of:

$$A-N=N-\underset{Y}{\underset{|}{\overset{X}{\underset{|}{\bigcirc}}}}-\underset{R}{\overset{|}{N}}-CH(CH_2OH)-C_6H_5 \quad \text{and} \quad A-N=N-\underset{Y}{\underset{|}{\overset{X}{\underset{|}{\bigcirc}}}}-\underset{R}{\overset{|}{N}}-CH_2CH(OH)-C_6H_5$$

| Ex. No. | A | X | Y | R | Acylating agent | Shade on polyglycol terephthalate fibres |
|---|---|---|---|---|---|---|
| 58 | $O_2N-C_6H_3(CH_3)-$ | —H | —H | —$C_2H_5$ | $CH_3CH_2COCl$ | Scarlet. |
| 59 | $O_2N-C_6H_3(CH_3)-$ | —H | —NH—$COCH_3$ | —$CH_2CH_2CN$ | $Cl-CH_2COCl$ | Do. |
| 60 | $CF_3-C_6H_3(NO_2)-$ | —H | —H | —$CH_2CH_2OH$ | $ClCH_2CH_2COCl$ | Do. |
| 61 | $O_2N-C_6H_3(Cl)-$ | —H | —$CH_3$ | —$CH_2CH_2CN$ | $CH_3-C_6H_4-SO_2Cl$ | Red. |
| 62 | $O_2N-C_6H_3(Cl)-$ | —H | —H | —$CH_2CH_2CN$ | $C_2H_5OCOCl$ | Orange. |
| 63 | $CH_3SO_2-C_6H_3(NO_2)-$ | —$OCH_3$ | —H | —$CH_2CH_2COOC_2H_5$ | $CH_3OCOCl$ | Bordeaux. |
| 64 | $O_2N-C_6H_3(CO-OC_2H_5)-$ | —H | —H | —$CH_2CH_2CN$ | $C_6H_5-COCl$ | Orange. |
| 65 | $C_6H_5-OSO_2-C_6H_3(NO_2)-$ | —H | —H | —$CH_2CH_2OH$ | $CH_3COCl$ | Scarlet. |
| 66 | $O_2N$-benzothiazol-2-yl | —H | —$CH_3$ | —$CH_2CH_3$ | $C_6H_5-SO_2Cl$ | Ruby. |
| 67 | NCS-benzothiazol-2-yl | —Cl | —H | —$CH_2CH_2CN$ | $C_3H_7COCl$ | Red. |
| 68 | CN-benzothiazol-2-yl | —H | —H | —$CH_2-CH_2-CN$ | $Cl-C_3H_6-CO-Cl$ | Red. | given and then the dyeing is rinsed with water, a reddish orange dyeing is obtained which has very good fastness to washing and sublimation.

*Example 70*

2 parts of the dyestuff obtained according to Example 27 are finely suspended, in a pressure dyeing apparatus, in 2000 parts of water which contains 4 parts of oleyl polyglycol ether. The pH of the dyebath is adjusted to 6–6.5 with acetic acid.

100 parts of polyglycol terephthalate fabric are introduced at 50°, the bath is heated within 30 minutes to 140° and dyeing is performed for 50 minutes at this temperature. The dyeing is then rinsed with water, soaped and dried. Under these conditions, a ruby dyeing is obtained which is fast to washing, perspiration, light and sublimation.

The dyestuffs described in the other examples produce dyeings of equal quality by this method.

*Example 71*

Polyglycol terephthalate fabric (such as "Dacron" of E. I. du Pont de Nemours, Wilmington, Del., U.S.A.) is impregnated in a foulard at 40° with a liquor of the following composition:

20 parts of the dyestuff obtained according to Example 12, finely dispersed in
7.5 parts of sodium alginate,
20 parts of triethanolamine,
20 parts of octylphenol polyglycol ether, and
900 parts of water.

The fabric is squeezed out to about 100% liquor content, dried at 100° and the dyeing is fixed for 30 seconds at a temperature of 210°. The dyed goods are rinsed with water, soaped and dried. Under these conditions, a red dyeing is obtained which is fast to washing, rubbing, light and sublimation.

The dyestuffs described in the other examples produce dyeings of equal quality by this process.

I claim:

1. A non-sulfonated, non-metallizable dispersible dyestuff falling under the formula $$A-N=N-\underset{Y}{\overset{X}{\bigcirc}}-\underset{R}{N}-\underset{E}{CH}-\underset{D}{CH}-OZ$$

wherein A represents a member selected from the group consisting of
p-nitro-phenyl; o-nitrophenyl;
p-nitro-phenyl substituted with from one to two non-ionogenic shade-influencing substituents at least one of which is in o-position at the phenyl nucleus;
o-nitro-phenyl substituted with from one to two non-ionogenic shade-influencing substitutents at least one of which is in p-position at the phenyl nucleus;
5-nitro-thiazolyl-(2) and
benzo-thiozolyl-(2) substituted in 6-position by a member selected from the group consisting of lower alkyl-sulfonyl, nitro, cyano, thiocyano, chlorine and bromine;
one of E and D represents hydrogen and the other phenyl;
the aforesaid shade-influencing substituents being selected from the group consisting of chlorine, bromine, fluorine, nitro, cyano, lower alkyl, lower alkoxy, trifluoromethyl, lower alkanoylamino, lower alkoxycarbonyl, phenoxy, phenoxysulfonyl, sulfamyl, dimethylaminosulfonyl, N-phenyl - N - methyl-aminosulfonyl, monomethylaminosulfonyl and lower alkyl-sulfonyl, R represents a member selected from the group consisting of lower alkanoyloxy-alkyl, lower alkoxycarbonyl-alkyl, cyano-alkyl, chloro-alkyl and bromo-alkyl, in which five members "alkyl" has from 2 to 4 carbon atoms and the respective substituent is in one of the positions β, γ and δ of the last-mentioned alkyl; and X is a member selected from the group consisting of hydrogen, lower alkyl, lower alkoxy, chlorine and bromine;

Y is a member selected from the group consisting of hydrogen, lower alkyl, lower alkoxy, trifluoromethyl, chlorine, bromine, and lower-alkanoylamino;

Z is a member selected from the group consisting of alkanoyl of from 2 to 4 carbon atoms, chloro- and bromo-alkanoyl of from 2 to 4 carbon atoms, benzoyl, lower alkoxy carbonyl, phenylsulfonyl and toluylsulfonyl.

2. A dyestuff being a mixture of the two compounds falling under the formula $$NO_2-\underset{Cl}{\bigcirc}-N=N-\bigcirc-N-\underset{E}{\overset{CH_2-CH_2-CN}{|}}\underset{D}{CH}-CH-O-CO-CH_3$$

wherein one of E and D is hydrogen and the other is phenyl.

3. A dyestuff being a mixture of the two compounds falling under the formula $$NO_2-\bigcirc-N=N-\underset{CN}{\overset{CH_3}{\bigcirc}}-N-\underset{CH_2-CH_2-O-CO-CH_3}{\overset{E\ \ D}{CH-CH-O-CO-CH_3}}$$

wherein one of E and D is hydrogen and the other is phenyl.

4. A dyestuff being a mixture of the two compounds falling under the formula $$NO_2-\bigcirc-N=N-\underset{CN}{\bigcirc}-N-\underset{CH_2-CH_2-CN}{\overset{E\ \ D}{CH-CH-O-CO-CH_3}}$$

wherein one of E and D is hydrogen and the other is phenyl.

5. A dyestuff being a mixture of the two compounds falling under the formula $$CN-\underset{N}{\overset{S}{\bigcirc}}C-N=N-\bigcirc-N\underset{CH_2-CH_2-CN}{\overset{\overset{E\ \ D}{CH-CH-O-CO}}{\underset{CH_2-CH_2-CH_2-Cl}{}}}$$

wherein one of E and D is hydrogen and the other is phenyl.

References Cited

UNITED STATES PATENTS

| | | | |
|---|---|---|---|
| 2,238,485 | 4/1941 | Dickey et al. | 260—205 |
| 2,891,942 | 6/1959 | Merian | 260—207.1 |
| 3,084,153 | 4/1963 | Ribbons et al. | 260—158 |
| 3,122,410 | 2/1964 | Mueller et al. | 8—41 |

CHARLES B. PARKER, *Primary Examiner.*

F. HIGEL, *Assistant Examiner.*